US011251662B2

(12) United States Patent
Lu et al.

(10) Patent No.: US 11,251,662 B2
(45) Date of Patent: Feb. 15, 2022

(54) CHARGING BOARD WITH ADJUSTABLE CHARGING POSITION AND CHARGING CONTROL METHOD THEREOF

(71) Applicants: DEXIN ELECTRONIC LTD., Guangdong (CN); DEXIN CORPORATION, New Taipei (TW)

(72) Inventors: Ho-Lung Lu, New Taipei (TW); Yuan-Jung Chang, New Taipei (TW)

(73) Assignees: DEXIN ELECTRONIC LTD., Guangdong (CN); DEXIN CORPORATION, New Taipei (TW)

( * ) Notice: Subject to any disclaimer, the term of this patent is extended or adjusted under 35 U.S.C. 154(b) by 10 days.

(21) Appl. No.: 17/013,863

(22) Filed: Sep. 8, 2020

(65) Prior Publication Data
US 2021/0203195 A1    Jul. 1, 2021

(30) Foreign Application Priority Data
Dec. 30, 2019    (TW) .................................. 108148264

(51) Int. Cl.
| | |
|---|---|
| *H01M 10/44* | (2006.01) |
| *H01M 10/46* | (2006.01) |
| *H02J 50/90* | (2016.01) |
| *H02J 50/10* | (2016.01) |
| *G06F 3/039* | (2013.01) |
| *H02J 7/00* | (2006.01) |
| *G06F 3/0354* | (2013.01) |
| *H02J 7/04* | (2006.01) |

(52) U.S. Cl.
CPC ............ *H02J 50/90* (2016.02); *G06F 3/0395* (2013.01); *G06F 3/03543* (2013.01); *H02J 7/0047* (2013.01); *H02J 7/04* (2013.01); *H02J 50/10* (2016.02)

(58) Field of Classification Search
CPC .. H02J 7/0047; H02J 7/04; H02J 50/90; H02J 50/10; H02J 50/005; G06F 3/0395
USPC .......... 320/107, 108, 114, 115, 149; 307/104
See application file for complete search history.

(56) References Cited

U.S. PATENT DOCUMENTS

| | | | | |
|---|---|---|---|---|
| 2009/0153098 | A1* | 6/2009 | Toya ..................... | H02J 7/0042 320/108 |
| 2010/0270970 | A1* | 10/2010 | Toya ..................... | H02J 50/60 320/108 |
| 2010/0315039 | A1* | 12/2010 | Terao ..................... | H01F 38/14 320/108 |
| 2012/0119708 | A1* | 5/2012 | Toya ..................... | H02J 7/0042 320/137 |
| 2012/0326659 | A1* | 12/2012 | Shukuya ............... | H02J 7/0044 320/108 |

(Continued)

*Primary Examiner* — Edward Tso
(74) *Attorney, Agent, or Firm* — Li & Cai Intellectual Property Office

(57) ABSTRACT

A charging board with an adjustable charging position and a charging method thereof are provided. The charging board includes a control circuit, an indicating circuit and a board body. The board body has a coil accommodating portion, and the coil accommodating portion has a transmitting coil. The transmitting coil can be adjusted in the coil accommodating portion. The control circuit detects the storage position of the transmitting coil, and controls the indicating circuit to output a corresponding indication signal according to the detection result. Thereby, the charging board can be used by a user to adjust the charging position.

14 Claims, 6 Drawing Sheets

(56) References Cited

U.S. PATENT DOCUMENTS

| | | | |
|---|---|---|---|
| 2013/0009594 A1* | 1/2013 | Osswald | H02J 50/10 320/108 |
| 2016/0052415 A1* | 2/2016 | Bell | B60L 53/124 320/108 |
| 2016/0134156 A1* | 5/2016 | Jing | H04B 1/3883 320/108 |

* cited by examiner

CHARGING BOARD WITH ADJUSTABLE CHARGING POSITION AND CHARGING CONTROL METHOD THEREOF

CROSS-REFERENCE TO RELATED PATENT APPLICATION

This application claims the benefit of priority to Taiwan Patent Application No. 108148264, filed on Dec. 30, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a charging board, and more particularly to a wireless charging board and a charging control method thereof.

BACKGROUND OF THE DISCLOSURE

A conventional charging board for a wireless charging mouse works mainly by using an inbuilt transmitting coil. Therefore, when the wireless charging mouse is put on the conventional charging board above the transmitting coil, the conventional charging board can wirelessly charge the wireless charging mouse. However, a charging position provided by the conventional charging board is fixed, and the wireless charging mouse needs to be placed on the fixed charging position on the charging board so as to be wirelessly charged.

SUMMARY OF THE DISCLOSURE

In response to the above-referenced technical inadequacies, the present disclosure provides a charging board with an adjustable charging position, and a charging control method thereof. The charging position of the charging board can be manually adjusted by a user, and the charging board can inform the user of the charging position.

An embodiment of the present disclosure provides a charging board with an adjustable charging position, which includes a board body, a control circuit, and an indicating circuit. The board body has a coil accommodating portion and a transmitting coil, and the transmitting coil is provided on a manually adjustable position in the coil accommodating portion. The control circuit is electrically connected to the transmitting coil and the indicating circuit. The control circuit controls the indicating circuit to output a corresponding indication signal according to a position of the transmitting coil in the coil accommodating portion.

An embodiment of the present disclosure provides a charging control method of a charging board with an adjustable charging position, where the charging board has a coil accommodating portion in which a transmitting coil can be manually adjusted to different positions. The charging control method includes the following steps: detecting a position of the transmitting coil in the coil accommodating portion; and outputting a corresponding indication signal according to a detection result, where the indication signal indicates the position of the transmitting coil in the coil accommodating portion, and the indication signal is one or a combination of an optical signal and an audio signal.

To sum up, by the charging board with an adjustable charging position and a charging control method thereof provided by the embodiments of the present disclosure, a user can arrange the position of the transmitting coil in the charging board by himself/herself, to accommodate usage habits of different users. The charging board can prompt the user by outputting an indication signal, so that the user can know conveniently and rapidly a charging position of the charging board.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
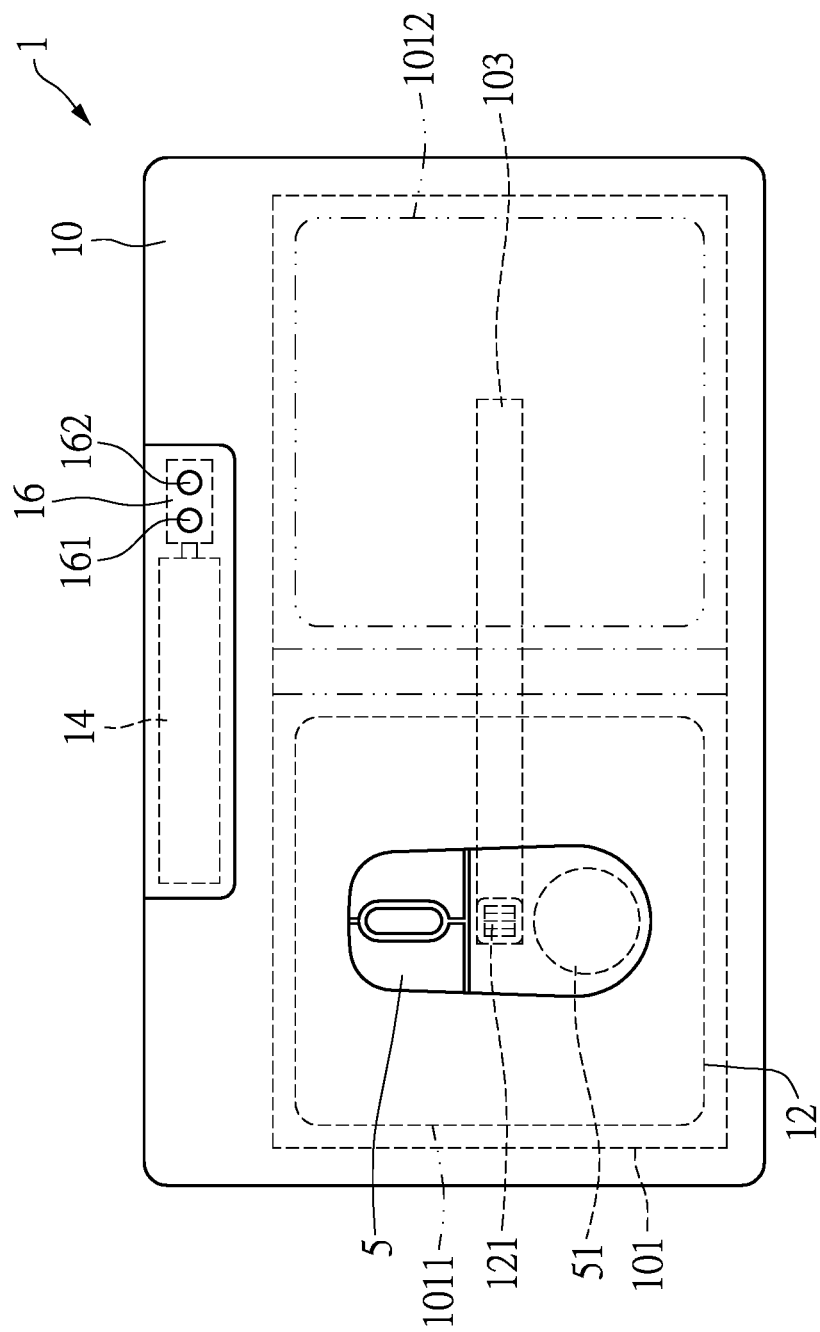
FIG. 1 is a schematic diagram of a charging board with a slidable transmitting coil in an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Embodiments of the present disclosure provide a charging board with an adjustable charging position and a charging control method thereof. A wireless charging mouse pad for computer peripherals is used as an example of the charging board herein for description. The charging board can be used to wirelessly charge a wireless charging mouse, and further, a user can manually adjust the position of a coil in the charging board according to a preference of the user. That is to say, if the user prefers operating the wireless charging mouse on the right side of the charging board, the user may manually adjust the coil in the charging board to the right side of the charging board. In this way, after being put on a charging position on the right side of the charging board, the wireless charging mouse can be wirelessly charged. Moreover, in order to enable the user to easily know the position of the coil in the charging board, the charging board may automatically output an indication signal to prompt the user. Therefore, by using the charging board with the adjustable charging position of the present disclosure, the user can conveniently perform operations, and further, it is not necessary to dispose a plurality of coils in the charging board to accommodate the habits of different users of the charging board. Thus, the charging board can save energy and achieve an efficient wireless charging function.

Embodiment of a Charging Board with a Slidable Transmitting Coil

Reference is made to FIG. 1, which is a schematic diagram of a charging board with a slidable transmitting coil in an embodiment of the present disclosure. The charging board 1 with the adjustable charging position in this embodiment includes, for example, but is not limited to, a board body 10, a control circuit 14, and an indicating circuit 16. The control circuit 14 and the indicating circuit 16 are disposed, for example, on a side of the board body 10. A surface of the board body 10 is used by a user to operate a wireless charging mouse 5 thereon. A coil accommodating portion 101 may be further provided below the surface of the board body 10. The coil accommodating portion 101 provides, for example, two storage positions: a first storage position 1011 and a second storage position 1012 which adjoin each other and are connected via a rail 103. A transmitting coil 12 may be disposed in the first storage position 1011 or the second storage position 1012.

Further, when disposed in the first storage position 1011, the transmitting coil 12 may be moved by the user to the second storage position 1012 through the rail 103; or when disposed in the second storage position 1012, the transmitting coil 12 may also be moved by the user to the first storage position 1011 through the rail 103. An actual movement mode of the transmitting coil 12 is, for example, manually controlling the transmitting coil 12 to move through the rail 103 by the user from a back side of the board body 10, thus enabling the transmitting coil 12 to be moved between the first storage position 1011 and the second storage position 1012. In an embodiment, the transmitting coil 12 may be further provided with a slide knob 121 to make it convenient for the user to control movement of the transmitting coil 12 on the rail 103.

It should be noted that, the control circuit 14 may detect a current storage position of the transmitting coil 12, and control the indicating circuit 16 to output a corresponding indication signal according to a detection result. In addition, the control circuit 14 may further control the transmitting coil 12 to externally emit electromagnetic energy, to wirelessly charge the wireless charging mouse 5. The indicating circuit 16 may be, for example, a light-emitting indicating circuit capable of outputting an optical indication signal, an audio indicating circuit capable of outputting an audio indication signal, or any combination thereof. The light-emitting indicating circuit may use a light-emitting element to give out light to exhibit the optical indication signal, where the light-emitting element is, for example, a light-emitting diode. The audio indicating circuit may use a speaker element to send out sound to exhibit the audio indication signal, where the speaker element is, for example, a loudspeaker or buzzer.

As shown in FIG. 1, the indicating circuit 16 includes, for example, a first light-emitting circuit 161 and a second light-emitting circuit 162 which are arranged in a direction identical with an arrangement direction of the first storage position 1011 and the second storage position 1012, so that the user can easily and visibly find out where the transmitting coil 12 is currently located. For example, when the transmitting coil 12 is disposed in the first storage position 1011, the control circuit 14 controls the first light-emitting circuit 161 in the indicating circuit 16 to output a first indication signal. When the transmitting coil 12 is disposed in the second storage position 1012, the control circuit 14 controls the second light-emitting circuit 162 in the indicating circuit 16 to output a second indication signal. The first indication signal and the second indication signal may be optical signals which differ in one or any combination of the following features: light color, brightness, and flicker frequency.

In another embodiment, the indicating circuit 16 may also be a single light-emitting circuit, and sends out optical signals of different colors or at different flicker frequencies to show different storage positions of the transmitting coil 12 in the coil accommodating portion 101.

Further, during actual use of the charging board 1 shown in FIG. 1, the transmitting coil 12 is disposed in the first storage position 1011. In this case, the first light-emitting circuit 161 in the indicating circuit 16 outputs a first indication signal, and the user can easily know that the transmitting coil 12 is currently in the first storage position 1011 according to the optical indication signal exhibited by the first light-emitting circuit 161. Therefore, in this case, the user may put the wireless charging mouse 5 to be operated on a position corresponding to the first storage position 1011 on the surface of the board body 10. In this way, while the wireless charging mouse 5 is operated on a corresponding position above the transmitting coil 12 on the board body 10 to move a cursor, a receiving coil 51 of the wireless charging mouse 5 can receive the electromagnetic energy from the transmitting coil 12 below the surface of the board body 10 to implement wireless charging.

Moreover, there may be a plurality of positions for storing the transmitting coil 12 shown in FIG. 1, and a number of the storage positions is not limited to being only two. In addition, the surface of the board body 10 that is corresponding to the storage position may be further provided with patterns, lines, text, or any combination thereof, so as to inform the user of the setting position of the transmitting coil 12.

Embodiment of a Charging Board with a Rotatable Transmitting Coil

Figure 2:
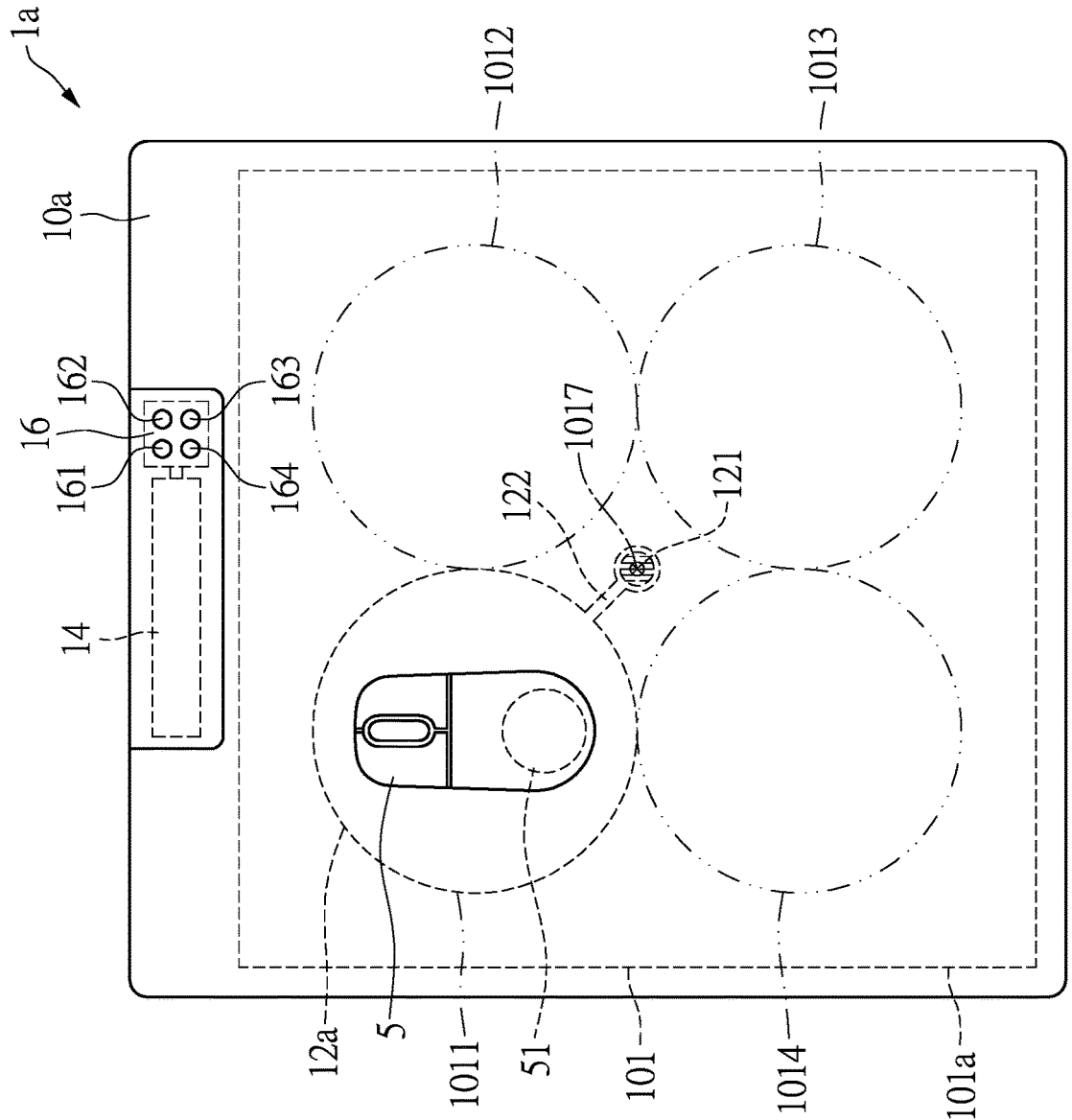
FIG. 2 is a schematic diagram of a charging board with a rotatable transmitting coil in an embodiment of the present disclosure.

Reference is made to FIG. 2, which is a schematic diagram of a charging board with a rotatable transmitting coil in an embodiment of the present disclosure. Compared with the charging board 1 shown in FIG. 1, a charging board 1a in this embodiment shown in FIG. 2 is provided with two more charging positions for the transmitting coil to use, and a movement mode of the transmitting coil 12 is also different. It should be noted that only the differences are described herein, and elements with the same numerals have the same functions and are not described in detail herein.

As shown in FIG. 2, a coil accommodating portion 101a of a board body 10a includes a first storage position 1011, a second storage position 1012, a third storage position 1013, and a fourth storage position 1014. The indicating circuit 16 includes a first light-emitting circuit 161, a second light-emitting circuit 162, a third light-emitting circuit 163, and a fourth light-emitting circuit 164. The coil accommodating portion 101a has a central point 1017; and the first, second, third, and fourth storage positions 1011, 1012, 1013, and 1014 are disposed to surround the central point 1017. The transmitting coil 12a is provided with an extending arm 122, one end of which is pivoted to the central point 1017. In this way, the transmitting coil 12a may be rotated clockwise or counterclockwise about the central point 1017 via the extending arm 122.

As shown in FIG. 2, the transmitting coil 12a is disposed in the first storage position 1011. In this case, the transmitting coil 12a may be rotated clockwise to the second storage position 1012 or counterclockwise to the fourth storage position 1014. After being rotated to the second storage position 1012, the transmitting coil 12a may be further rotated clockwise to the third storage position 1013. After being rotated to the fourth storage position 1014, the transmitting coil 12a may be further rotated counterclockwise to the third storage position 1013. In a word, by controlling a rotation direction of the transmitting coil 12a, the transmitting coil 12a can be moved to any of the first, second, third, and fourth storage positions 1011, 1012, 1013, and 1014.

The first light-emitting circuit 161, the second light-emitting circuit 162, the third light-emitting circuit 163, and the fourth light-emitting circuit 164 in the indicating circuit 16a are arranged in a direction identical with an arrangement direction of the first storage position 1011, the second storage position 1012, the third storage position 1013, and the fourth storage position 1014. When the transmitting coil 12a is disposed in the first storage position 1011, the first light-emitting circuit 161 outputs a corresponding first indication signal; when the transmitting coil 12a is disposed in the second storage position 1012, the second light-emitting circuit 162 outputs a corresponding second indication signal; when the transmitting coil 12a is disposed in the third storage position 1013, the third light-emitting circuit 163 outputs a corresponding third indication signal; and when the transmitting coil 12a is disposed in the fourth storage position 1014, the fourth light-emitting circuit 164 outputs a corresponding fourth indication signal. The first, second, third, and fourth indication signals are optical signals which can differ in any feature.

Therefore, a user can immediately know an exact position of the transmitting coil 12a in the charging board 1a according to an illumination status of the first light-emitting circuit 161, the second light-emitting circuit 162, the third light-emitting circuit 163, or the fourth light-emitting circuit 164. As shown in FIG. 2, when the first light-emitting circuit 161 emits light, the user may put the wireless charging mouse 5 on a position corresponding to the first storage position 1011 on the surface of the board body 10a. Therefore, while the wireless charging mouse 5 is operated on this position, the charging board 1a wirelessly charges the wireless charging mouse 5.

Embodiment of a Charging Board with a Detachable Transmitting Coil

Figure 3:
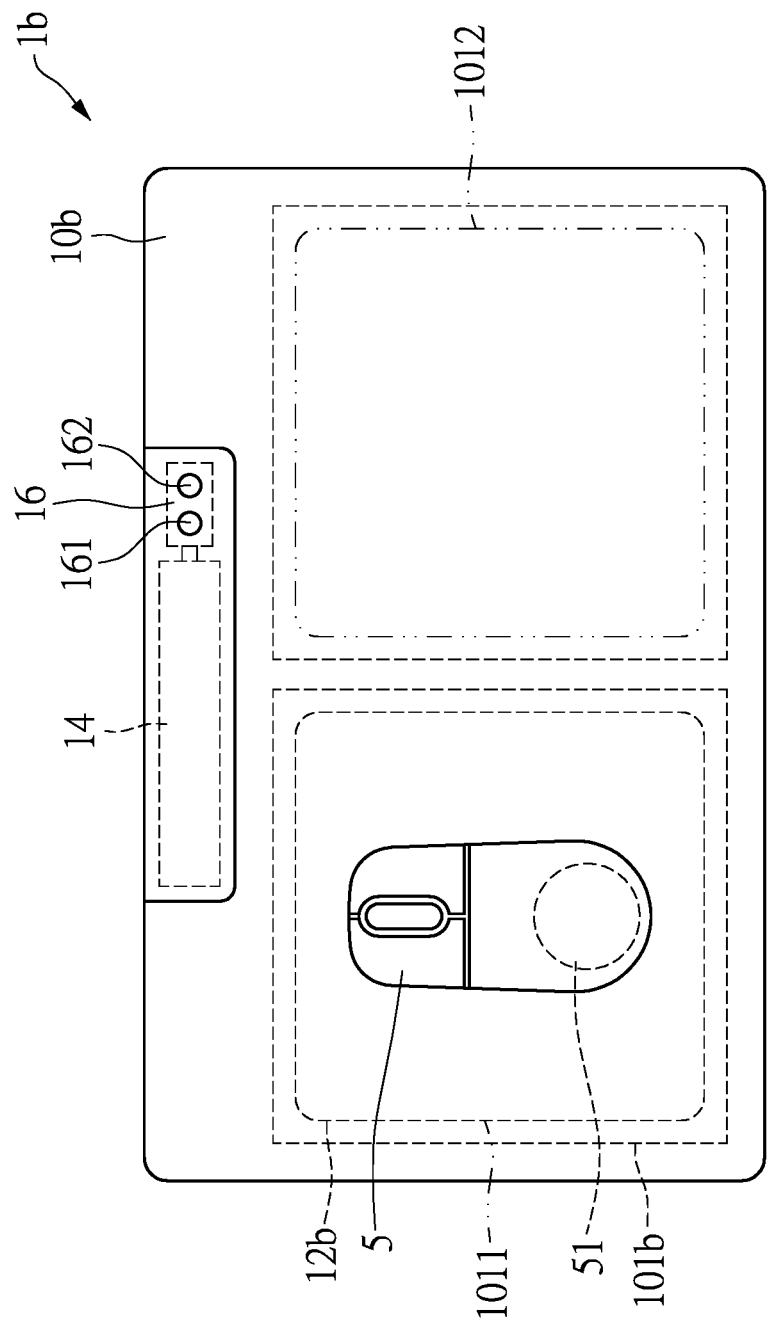
FIG. 3 is a schematic diagram of a charging board with a detachable transmitting coil in an embodiment of the present disclosure.

Reference is made to FIG. 3, which is a schematic diagram of a charging board with a detachable transmitting coil in an embodiment of the present disclosure. A difference between a charging board 1b in this embodiment shown in FIG. 3 and the charging board 1 shown in FIG. 1 lies in that, a transmitting coil 12b is moved in a different manner. It should be noted that only the differences are described herein, and elements with the same numerals have the same functions and are not described in detail herein. Specifically, the transmitting coils in FIG. 1 and FIG. 2 are both moved within the coil accommodating portion and neither leave the charging board, while the transmitting coil 12b in the charging board 1b shown in FIG. 3 can be taken out of a board body 10b during movement.

For example, a coil accommodating portion 101b shown in FIG. 3 includes a first storage position 1011 and a second storage position 1012 that are independent of each other. The first storage position 1011 and the second storage position 1012 are located in different positions in the coil accommodating portion 101b and used to accommodate the transmitting coil 12b. Further, when disposed in the first storage position 1011, the transmitting coil 12b may be further fixed in the first storage position 1011 by snap-fastening, to prevent the transmitting coil 12b from detaching from the board body 10b. When disposed in the second storage position 1012, the transmitting coil 12b may be further fixed in the second storage position 1012 by snap-fastening, to prevent the transmitting coil 12b from detaching from the board body 10b.

Therefore, in actual use of the charging board 1b shown in FIG. 3, to move the transmitting coil 12b, a user may manually take off the transmitting coil 12b directly from the first storage position 1011 from the back side of the board body 10b to detach the coil from the board body 10b, and then place the detached transmitting coil 12b to the second storage position 1012 on the back side of the board body 10b.

Embodiment of a Charging Board with a Transmitting Coil that can be Flipped

Figure 4:
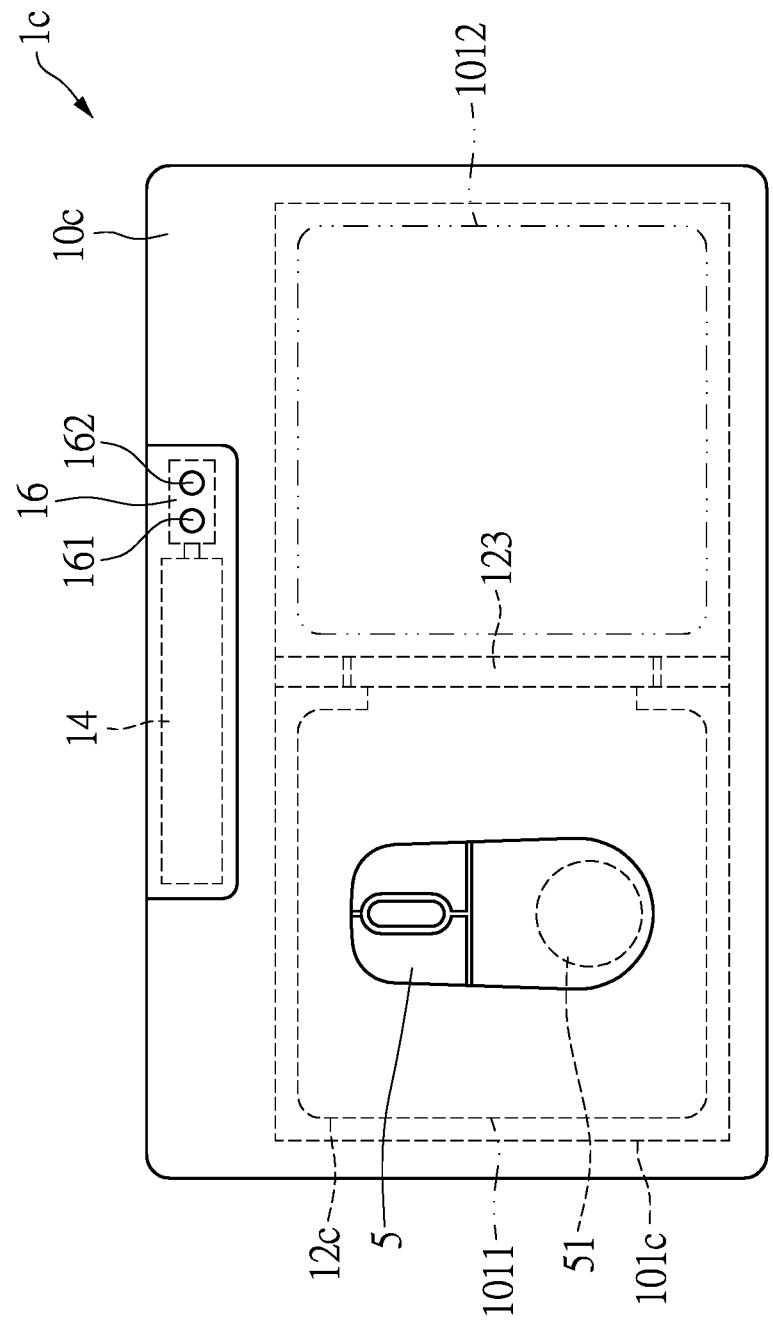
FIG. 4 is a schematic diagram of a charging board with a transmitting coil that can be flipped in an embodiment of the present disclosure.

Reference is made to FIG. 4, which is a schematic diagram of a charging board with a transmitting coil that can be flipped in an embodiment of the present disclosure. A difference between a charging board 1c in this embodiment shown in FIG. 4 and the charging board 1 shown in FIG. 1 lies in that, a transmitting coil 12c is moved in a different manner. It should be noted that only the differences are described herein, and elements with the same numerals have the same functions and are not described in detail herein. Specifically, the transmitting coil 12c in FIG. 4 is moved to a different storage position by flipping. The transmitting coil 12c in the charging board 1c shown in FIG. 4 is provided with a rotation shaft 123 on one side, and is pivoted to a coil accommodating portion 101*c* via the rotation shaft 123. Thus, the transmitting coil 12*c* can be flipped between the first storage position 1011 and the second storage position 1012 of the coil accommodating portion 101*c* via the rotation shaft 123.

Therefore, in actual use of the charging board 1*c* shown in FIG. 4, to move the transmitting coil 12*c*, a user may manually flip the transmitting coil 12*c* directly from the first storage position 1011 to the second storage position 1012 from the back side of the board body 10*c*. In addition, in an embodiment, the first storage position 1011 and the second storage position 1012 in FIG. 4 may be each provided with a snap-fastener on one side to fix the transmitting coil 12*c*, so as to prevent the transmitting coil 12*c* from shaking in the coil accommodating portion 101*c*.

Embodiment of Function Blocks of a Charging Board

Figure 5:
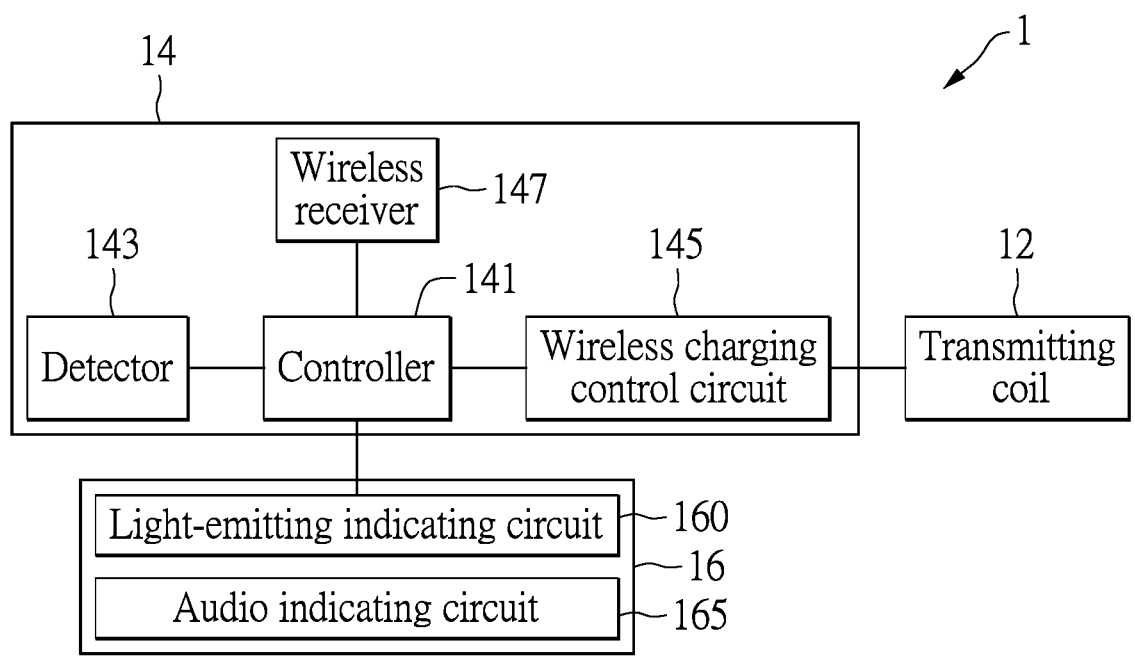
FIG. 5 is a function block diagram of a charging board in an embodiment of the present disclosure.

Reference is made to FIG. 5, which is a function block diagram of a charging board in an embodiment of the present disclosure. The charging board 1 in the embodiment shown in FIG. 5 includes, but is not limited to, a control circuit 14, an indicating circuit 16, and a transmitting coil 12. The control circuit 14 further includes a controller 141, a detector 143, a wireless charging control circuit 145, and a wireless receiver 147. The controller 141 is electrically connected to the detector 143, the wireless charging control circuit 145, and the wireless receiver 147 respectively. The indicating circuit 16 includes, for example, a light-emitting indicating circuit 160 and an audio indicating circuit 165.

The detector 143 is used to detect a position of the transmitting coil 12, and output a position signal to the controller 141 according to a detection result. The controller 141 then controls, according to the position signal, the indicating circuit 16 to output a corresponding indication signal. In an embodiment, the detector 143 is, for example, a touch switch that can be disposed in any storage position. By using the charging board 1 shown in FIG. 1 as an example, the detector 143 may include a first touch switch element and a second touch switch element. The first touch switch element is disposed on one side of the first storage position 1011, and the transmitting coil 12 may touch the first touch switch element when placed in the first storage position 1011. The second touch switch element is disposed on one side of the second storage position 1012, and the transmitting coil 12 may touch the second touch switch element when placed in the second storage position.

Therefore, upon receiving a first position signal output by the first touch switch element, the controller 141 may learn that the transmitting coil 12 is currently disposed in the first storage position 1011, and then control the indicating circuit 16 to output a first indication signal. In addition, upon receiving a second position signal output by the second touch switch element, the controller 141 may learn that the transmitting coil 12 is currently disposed in the second storage position 1012, and then control the indicating circuit 16 to output a second indication signal.

After the first indication signal is received, the indicating circuit 16 may output a corresponding optical signal via the light-emitting indicating circuit 160, and a corresponding audio signal via the audio indicating circuit 165. In an embodiment, according to the number of the storage positions, the light-emitting indicating circuit 160 may be provided with a corresponding number of light-emitting circuits.

In addition, the wireless charging control circuit 145 is electrically connected to the transmitting coil 12. In an embodiment, the controller 141 controls the wireless charging control circuit 145 to charge a wireless charging mouse 5 on the charging board 1 in an electromagnetic induction manner by using the transmitting coil 12. The wireless charging technology provided by the wireless charging control circuit 145 and the transmitting coil 12 meets the Qi standard of the Wireless Power Consortium (WPC) or the PMA standard of the Power Matters Alliance (PMA), but is not limited in the present disclosure.

The wireless receiver 147 is used to be wirelessly connected to the wireless charging mouse 5 on the charging board 1 to transmit data. In an embodiment, after the wireless charging mouse 5 is put on the charging board 1 and receives electromagnetic energy from the transmitting coil 12, the wireless charging mouse 5 may output a charging signal to the wireless receiver 147. The wireless receiver 147 then determines whether or not the charging signal is received, and the controller 141 may learn, according to a determination result, whether or not the wireless charging mouse 5 is put on a charging position on the charging board 1 and wirelessly charged.

For example, when the controller 141 learns that the wireless receiver 147 receives the charging signal, it indicates that the wireless charging mouse 5 is currently put on a charging position corresponding to the transmitting coil 12 on the charging board 1. However, when the controller 141 learns that the wireless receiver 147 fails to receive the charging signal, it indicates that the wireless charging mouse 5 currently is not put on a charging position corresponding to the transmitting coil 12 on the charging board 1. Therefore, in this case, the controller 141 further controls the indicating circuit 16 to output a charging failure indication signal which may be an optical signal output by the light-emitting indicating circuit 160 or an audio signal output by the audio indicating circuit 165.

In addition, the wireless receiver 147 can be used to receive not only the charging signal output by the wireless charging mouse 5 but also a wireless input signal, for example, a mouse button signal or a cursor control signal, output by the wireless charging mouse 5 to a computer mainframe. Therefore, the charging board 1 may be further connected to the computer mainframe via a transmission line, to input the wireless input signal to the computer mainframe. Moreover, working power required by the charging board 1 may be supplied through the transmission line connected to the computer mainframe, or the charging board 1 is connected to a power converter via the transmission line to acquire an externally input power.

Furthermore, in an embodiment, the control circuit 14 shown in FIG. 5 may also not include the wireless receiver 147. In this case, the controller 141 can also detect the position of the transmitting coil 12 in the charging board 1 by using the detector 143, and control the indicating circuit 16 to output the indication signal, to inform the user of a current position of the transmitting coil 12.

Embodiment of a Charging Control Method of a Charging Board

Figure 6:
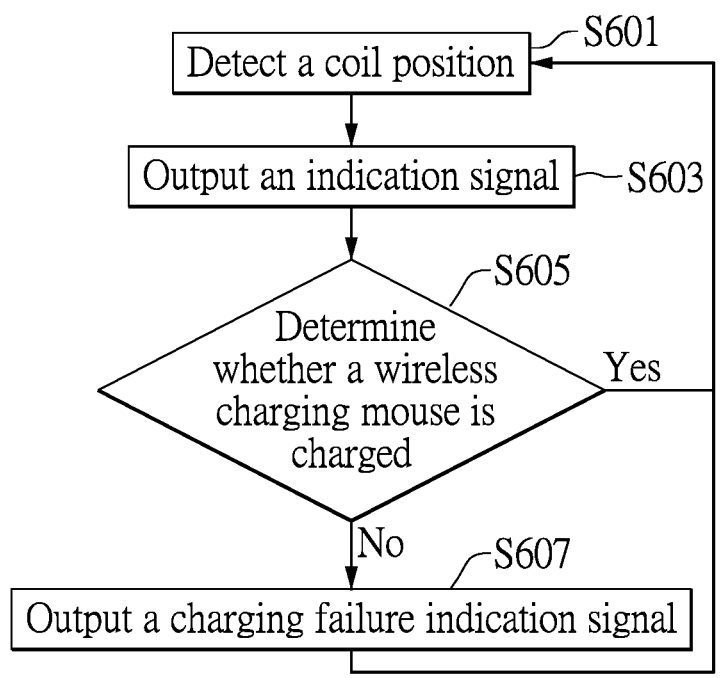
FIG. 6 is a charging control flowchart of a charging board in an embodiment of the present disclosure.

Reference is made to FIG. 6, which is a charging control flowchart of a charging board in an embodiment of the present disclosure. The flowchart shown in FIG. 6 is described below with reference to the foregoing relevant embodiments in combination.

In step S601, a coil position is detected. According to a detection result from detectors disposed in different storage positions, a charging board can learn an exact storage position to which a transmitting coil is moved.

In step S603, an indication signal is output. After step S601 is completed, the charging board learns the storage position of the transmitting coil, and thus further controls an indicating circuit to output the indication signal. The indication signal is output, for example, in the form of an optical signal or an audio signal, so as to prompt a user.

In step S605, it is determined whether or not a wireless charging mouse is charged. In this step, the charging board determines whether or not a charging signal output by the wireless charging mouse is wirelessly received, and if the charging signal output is wirelessly received, it is determined that the wireless charging mouse is currently put on a charging position on the charging board and wirelessly charged; otherwise, it is determined that the wireless charging mouse is currently not put on a charging position on the charging board and not wirelessly charged.

In step S607, a charging failure indication signal is output. If it is determined in step S605 that the wireless charging mouse is not charged, the charging board outputs the charging failure indication signal, so as to prompt the user to put the wireless charging mouse on a correct charging position on the charging board. For example, in this case, the user may check an optical indication signal output by a light-emitting indicating circuit to know a current position of the transmitting coil. The charging failure indication signal may be, for example, one or a combination of an optical signal and an audio signal output by the indicating circuit. If it is determined in step S605 that the wireless charging mouse is charged, the process goes back to step S601.

Advantageous Effects of the Embodiments

By the charging board with an adjustable charging position and a charging control method thereof provided by the present disclosure, a user can manually adjust the position of a transmitting coil in a charging board according to an operation habit and preference of the user, and the charging board can output an indication signal to inform the user of a currently accurate charging position of the transmitting coil in the charging board. In this way, while the user operates a wireless charging mouse on the charging board, the wireless charging mouse can be wirelessly charged. Moreover, it can be guaranteed that the wireless charging mouse has a stable power supply.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A charging board with an adjustable charging position, comprising:
   a board body including a coil accommodating portion and a transmitting coil, the transmitting coil being provided on a manually adjustable position in the coil accommodating portion;
   a control circuit electrically connected to the transmitting coil; and
   an indicating circuit electrically connected to the control circuit,
   wherein the control circuit controls the indicating circuit to output a corresponding indication signal according to a position of the transmitting coil in the coil accommodating portion.

2. The charging board with the adjustable charging position of claim 1, wherein the coil accommodating portion has a first storage position and a second storage position; when the transmitting coil is disposed in the first storage position, the control circuit controls the indicating circuit to output a first indication signal; and when the transmitting coil is disposed in the second storage position, the control circuit controls the indicating circuit to output a second indication signal.

3. The charging board with the adjustable charging position of claim 2, wherein the control circuit includes:
   a controller;
   a wireless charging control circuit electrically connected to the controller and the transmitting coil, wherein the wireless charging control circuit is controlled by the controller to charge a wireless charging mouse in an electromagnetic induction manner by using the transmitting coil; and
   a detection circuit electrically connected to the controller, wherein the detection circuit outputs a corresponding position signal to the controller after detecting the position of the transmitting coil in the coil accommodating portion, so that the controller controls the indicating circuit to output a corresponding indication signal according to the position signal.

4. The charging board with the adjustable charging position of claim 3, wherein the indicating circuit includes a first light-emitting circuit and a second light-emitting circuit; when the transmitting coil is disposed in the first storage position, the first indication signal output by the first light-emitting circuit is an optical signal; and when the transmitting coil is disposed in the second storage position, the second indication signal output by the second light-emitting circuit is an optical signal.

5. The charging board with the adjustable charging position of claim 4, wherein the indicating circuit further includes an audio indicating circuit, and the indication signal output by a speaker element in the audio indicating circuit is an audio signal.

6. The charging board with the adjustable charging position of claim 3, wherein the detection circuit includes a first touch switch element disposed in the first storage position and a second touch switch element disposed in the second storage position; when the transmitting coil is disposed in the first storage position, the first touch switch element touches the transmitting coil to output the position signal to the controller; and when the transmitting coil is disposed in the second storage position, the second touch switch element touches the transmitting coil to output the position signal to the controller.

7. The charging board with the adjustable charging position of claim 3, further comprising:
   a wireless receiver electrically connected to the controller and used for wirelessly receiving a charging signal output by the wireless charging mouse, wherein when the wireless charging mouse is put on the board body and receives electromagnetic energy output by the transmitting coil, the wireless charging mouse wirelessly outputs the charging signal; and when the wireless receiver fails to receive the charging signal, the controller controls the indicating circuit to output a charging failure indication signal, so as to indicate that the wireless charging mouse fails to receive the electromagnetic energy on a current position on the board body.

8. The charging board with the adjustable charging position of claim 2, wherein the board body is provided with a rail which connects the first storage position and the second storage position, so that the transmitting coil is moved between the first storage position and the second storage position via the rail.

9. The charging board with the adjustable charging position of claim 2, wherein the board body is provided with a central point, the transmitting coil is provided with an extending arm, and the extending arm is pivoted to the central point, so that the transmitting coil is rotated about the central point via the extending arm and moved to the first storage position or the second storage position.

10. The charging board with the adjustable charging position of claim 2, wherein the coil accommodating portion includes a first storage position and a second storage position that are independent of each other, and the transmitting coil is able to be taken off from the first storage position or the second storage position to detach from the board body.

11. The charging board with the adjustable charging position of claim 2, wherein the transmitting coil is provided with a rotation shaft on one side, and is pivoted to the coil accommodating portion via the rotation shaft, so that the transmitting coil is flipped about the rotation shaft to the second storage position when disposed in the first storage position, or is flipped about the rotation shaft to the first storage position when disposed in the second storage position.

12. A charging control method of a charging board, wherein the charging board has a coil accommodating portion in which a transmitting coil is able to be manually adjusted to different positions; and the method includes:

detecting a position of the transmitting coil in the coil accommodating portion; and outputting a corresponding indication signal according to a detection result, wherein the indication signal indicates the position of the transmitting coil in the coil accommodating portion, and one or a combination of an optical signal and an audio signal.

13. The charging control method of the charging board of claim 12, further comprising:

determining whether or not a wireless charging mouse is charged wirelessly on the charging board; and when the wireless charging mouse is not charged wirelessly on the charging board, outputting a charging failure indication signal which is one or a combination of an optical signal and an audio signal.

14. The charging control method of the charging board of claim 13, wherein when the charging board fails to wirelessly receive a charging signal output by the wireless charging mouse, it is determined that the wireless charging mouse is not wirelessly charged on the charging board, and wherein the charging signal is output by the wireless charging mouse when the wireless charging mouse is put on the charging board and receives electromagnetic energy from the transmitting coil.

\* \* \* \* \*

UNITED STATES PATENT AND TRADEMARK OFFICE
CERTIFICATE OF CORRECTION

| | |
|---|---|
| PATENT NO. | : 11,251,662 B2 |
| APPLICATION NO. | : 17/013863 |
| DATED | : February 15, 2022 |
| INVENTOR(S) | : Ho-Lung Lu and Yuan-Jung Chang |

Page 1 of 1

It is certified that error appears in the above-identified patent and that said Letters Patent is hereby corrected as shown below:

On the Title Page

(71) Applicants should read: DEXIN ELECTRONIC LTD., Dongguan (CN); DEXIN CORPORATION, New Taipei (TW)

(73) Assignees should read: DEXIN ELECTRONIC LTD., Dongguan (CN); DEXIN CORPORATION, New Taipei (TW)

Signed and Sealed this
Tenth Day of May, 2022

Katherine Kelly Vidal
*Director of the United States Patent and Trademark Office*